(12) United States Patent
Rei et al.

(10) Patent No.: US 11,797,822 B2
(45) Date of Patent: Oct. 24, 2023

(54) NEURAL NETWORK HAVING INPUT AND HIDDEN LAYERS OF EQUAL UNITS

(71) Applicant: Microsoft Technology Licensing, LLC, Redmond, WA (US)

(72) Inventors: Marek Rei, London (GB); Matthew James Willson, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1240 days.

(21) Appl. No.: 15/742,486

(22) PCT Filed: Jul. 5, 2016

(86) PCT No.: PCT/GB2016/052022
§ 371 (c)(1),
(2) Date: Jan. 5, 2018

(87) PCT Pub. No.: WO2017/006104
PCT Pub. Date: Jan. 12, 2017

(65) Prior Publication Data
US 2018/0204120 A1   Jul. 19, 2018

(30) Foreign Application Priority Data
Jul. 7, 2015 (GB) ...................... 1511887

(51) Int. Cl.
*G06N 3/04* (2023.01)
*G06N 3/044* (2023.01)
(Continued)

(52) U.S. Cl.
CPC ............... *G06N 3/04* (2013.01); *G06N 3/044* (2023.01); *G06N 3/084* (2013.01); *G06N 3/088* (2013.01)

(58) Field of Classification Search
CPC ........ G06N 3/04; G06N 3/0445; G06N 3/084; G06N 3/088; G06N 3/044
See application file for complete search history.

(56) References Cited

U.S. PATENT DOCUMENTS

| 5,293,458 A | 3/1994 | Chung et al. |
| 5,594,800 A * | 1/1997 | Gerzon ..................... H04S 3/02 |
| | | 381/20 |

(Continued)

FOREIGN PATENT DOCUMENTS

| CN | 101373468 A | 2/2009 |
| CN | 101566998 A | 10/2009 |

(Continued)

OTHER PUBLICATIONS

Haykin, S. (1999). "Neural Networks: A Comprehensive Foundation: Second Edition". Pearson Education. (Year: 1999).*

(Continued)

*Primary Examiner* — Brent Johnston Hoover
(74) *Attorney, Agent, or Firm* — Alleman Hall Creasman & Tuttle LLP

(57) ABSTRACT

The present invention relates to an improved artificial neural network for predicting one or more next items in a sequence of items based on an input sequence item. The improved artificial neural network has greatly reduced memory requirements, making it suitable for use on electronic devices such as mobile phones and tablets. The invention includes an electronic device on which the improved artificial neural network operates, and methods of predicting the one or more next items in the sequence using the improved artificial neural network.

15 Claims, 7 Drawing Sheets

(51) Int. Cl.
G06N 3/084 (2023.01)
G06N 3/088 (2023.01)

(56) References Cited

U.S. PATENT DOCUMENTS

| | | | |
|---|---|---|---|
| 5,822,730 | A | 10/1998 | Roth et al. |
| 5,905,773 | A | 5/1999 | Wong |
| 6,195,641 | B1 | 2/2001 | Loring et al. |
| 6,751,595 | B2 | 6/2004 | Busayapongchai et al. |
| 6,999,931 | B2 | 2/2006 | Zhou |
| 7,624,015 | B1 | 11/2009 | Rahim et al. |
| 7,716,058 | B2 | 5/2010 | Roth et al. |
| 8,589,163 | B2 | 11/2013 | Ljolje et al. |
| 9,158,559 | B2 | 10/2015 | Simmons et al. |
| 10,033,808 | B2 | 7/2018 | Simmons et al. |
| 11,205,110 | B2 | 12/2021 | Willson et al. |
| 2004/0186815 | A1 | 9/2004 | Stockfisch |
| 2007/0282768 | A1* | 12/2007 | Chang ............... G06N 5/02 706/16 |
| 2009/0063557 | A1* | 3/2009 | MacPherson ......... G06N 5/02 |
| 2009/0150593 | A1 | 6/2009 | Hamilton et al. |
| 2014/0278379 | A1 | 9/2014 | Coccaro et al. |
| 2015/0066496 | A1* | 3/2015 | Deoras ............. G06N 3/0454 704/232 |
| 2015/0095017 | A1 | 4/2015 | Kavukcuoglu et al. |
| 2015/0100537 | A1 | 4/2015 | Grieves et al. |
| 2015/0213365 | A1 | 7/2015 | Ideses et al. |
| 2016/0148078 | A1 | 5/2016 | Shen et al. |
| 2016/0299685 | A1 | 10/2016 | Zhai et al. |
| 2016/0328644 | A1 | 11/2016 | Lin et al. |
| 2016/0342720 | A1* | 11/2016 | Veneris ............. G06F 30/20 |
| 2017/0091169 | A1* | 3/2017 | Bellegarda .......... G10L 15/183 |
| 2017/0372696 | A1 | 12/2017 | Lee |
| 2018/0114112 | A1 | 4/2018 | Willson et al. |
| 2021/0097389 | A1* | 4/2021 | Kiranyaz ............. G06N 3/08 |
| 2021/0390723 | A1* | 12/2021 | Ye .................... G06N 3/0481 |

FOREIGN PATENT DOCUMENTS

| | | |
|---|---|---|
| CN | 101681198 A | 3/2010 |
| CN | 101697099 A | 4/2010 |
| CN | 101853426 A | 10/2010 |
| CN | 103733210 A | 4/2014 |
| CN | 103810999 A | 5/2014 |
| CN | 103870000 A | 6/2014 |
| CN | 103870001 A | 6/2014 |
| CN | 104036010 A | 9/2014 |
| CN | 104504442 A | 4/2015 |
| CN | 104951428 A | 9/2015 |
| EP | 3054403 A2 | 8/2016 |

OTHER PUBLICATIONS

Liu, X., et al. (May 2014). "Efficient lattice rescoring using recurrent neural network language models". In 2014 IEEE International Conference on Acoustics, Speech and Signal Processing (ICASSP) (pp. 4908-4912). IEEE. (Year: 2014).*
Karsoliya, S. (2012). Approximating number of hidden layer neurons in multiple hidden layer BPNN architecture. International Journal of Engineering Trends and Technology, 3(6), 714-717. (Year: 2012).*
Makhzani, A. et al. (2014). "k-Sparse Autoencoders". arXiv:1312.5663v2 Mar. 22, 2014 (Year: 2014).*
Liu et al., "Efficient Lattice Rescoring Using Recurrent Neural Network Language Models", Jul. 14, 2014, 2014 IEEE International Conference on Acoustic, Speech and Signal Processing (ICASSP), pp. 4908-4912. (Year: 2014).*
Jagla et al., "Adaptive encoding neural networks for the recognition of human signal peptide cleavage sites", Mar. 2000, Bioinformatics, vol. 16, Issue 3, Mar. 2000, pp. 245-250. (Year: 2000).*
Monjezi et al., "Evaluation of effect of blasting pattern parameters on back break using neural networks", Apr. 23, 2008, International Journal of Rock Mechanics & Mining Sciences 45 (2008), pp. 1446-1453. (Year: 2008).*
"Non Final Office Action Issued in U.S. Appl. No. 15/332,907", dated May 12, 2020, 53 Pages.
"Office Action Issued in European Patent Application No. 16738856.0", dated Jun. 5, 2020, 5 Pages.
"Final Office Action Issued in U.S. Appl. No. 15/332,907", dated Jan. 10, 2020, 52 Pages.
"Office Action Issued in European Patent Application No. 17797481.3", dated Sep. 9, 2020, 10 Pages.
Coninck, et al., "DIANNE: Distributed Artificial Neural Networks for the Internet of Things", In Proceedings of the 2nd Workshop on Middleware for Context-Aware Applications in the IoT, Dec. 7, 2015, pp. 19-24.
Makarenkov, et al., "Language Models with GloVe Word Embeddings", In Journal of Computing Research Repository, Oct. 12, 2016, 7 Pages.
International Patent Application No. PCT/GB2016/052022; Int'l Search Report and the Written Opinion; dated Sep. 30, 2016; 12 pages.
International Patent Application No. PCT/GB2016/052022; Int'l Preliminary Report on Patentability; dated Sep. 20, 2017; 14 pages.
"How Do Neural Networks Make Better Word Predictions", Retrieved From: https://web.archive.org/web/20160313213723/https://d3vvnhml5anv1n.cloudfront.net/content/uploads/2015/10/neural-net-infographic.jpg, Mar. 13, 2016, 4 Pages.
"Introducing the World's First Neural Network Keyboard", Retrieved From: http://web.archive.org/web/20160404191822/https://blog.swiftkey.com/neural-networks-a-meaningful-leap-for-mobile-typing, Oct. 8, 2015, 8 Pages.
"Office Action Issued in European Patent Application No. 17797481.3", dated Jun. 3, 2019, 3 Pages.
Bengio, Yoshua, "Neural Net Language Models", In Journal of Scholarpedia, vol. 3, Issue 1, Jan. 2008, 7 Pages.
Chen, et al., "Strategies for Training Large Vocabulary Neural Language Models", In Proceedings of 54th Annual Meeting of the Association for Computational Linguistics, Aug. 7, 2016, pp. 1975-1985.
Ganguly, et al., "A Word Embedding Based Generalized Language Model for Information Retrieval", In Proceedings of 38th International ACM SIGIR Conference on Research and Development in Information Retrieval, Aug. 9, 2015, pp. 795-798.
Goldberg, Yoav, "A Primer on Neural Network Models for Natural Language Processing", In Journal of The Computing Research Repository, Oct. 5, 2015, 76 Pages.
Leong, et al., "On Adaptive Caching in Mobile Databases", In Proceedings of the ACM Symposium on Applied Computing, Apr. 1, 1997, pp. 302-309.
Mi, et al., "Vocabulary Manipulation for Neural Machine Translation", In Proceedings of 54th Annual Meeting of the Association for Computational Linguistics, Aug. 7, 2016, pp. 124-129.
"International Search Report and Written Opinion Issued in PCT Application No. PCT/US2017/056702", dated Feb. 6, 2018, 16 Pages.
Pennington, et al., "GloVe: Global Vectors for Word Representation", Retrieved From: http://web.archive.org/web/20160925004021/https://nlp.stanford.edu/projects/glove/, Sep. 25, 2016, 3 Pages.
Plieninger, Andreas, "Deep Learning Neural Networks on Mobile Platforms", Submitted in Ph.D. Thesis, University of Munchen, Germany, Oct. 12, 2015, 31 Pages.
Schwenk, Holger, "Continuous Space Language Models", In Journal of Computer Speech and Language, vol. 21, Issue 3, Oct. 9, 2006, pp. 492-518.
Stolcke, et al., "SRILM at Sixteen: Update and Outlook", In Proceedings of IEEE Automatic Speech Recognition and Understanding Workshop, vol. 5, Dec. 11, 2011, 5 Pages.
"First Office Action and Search Report Issued in Chinese Patent Application No. 201680040427.1", dated Nov. 26, 2020, 15 Pages.
"Final Office Action Issued in U.S. Appl. No. 15/332,907", dated Oct. 30, 2020, 63 Pages.
"Second Office Action Issued in Chinese Patent Application No. 201680040427.1", dated Jun. 9, 2021, 14 Pages.

(56) References Cited

OTHER PUBLICATIONS

"Non Final Office Action Issued in U.S. Appl. No. 15/332,907", dated Jun. 28, 2019, 44 Pages.
Hua, et al., "Quantum Gate Elman Neural Network and Its Quantized Extended Gradient Back-propagation Training Algorithm", In the Journal of Acta Automatica Sinica, vol. 39, Issue 9, Sep. 2013, pp. 1511-1522. (English Abstract Submitted).
"Notice of Allowance Issued in Chinese Patent Application No. 201680040427.1", dated Jan. 14, 2022, 7 Pages.
Gupta, et al., "Investigating the Prediction Capabilities of the Simple Recurrent Neural Network on Real Temporal Sequences", In the Journal of Pattern Recognition, vol. 33, Issue 12, Dec. 2000, pp. 2075-2081.
"Office Action Issued in European Patent Application No. 16738856.0", dated Sep. 29, 2021, 6 Pages.
Graves, Alex, "Generating Sequences with Recurrent Neural Networks", In Repository of arXiv:1308.0850v5, Jun. 5, 2014, 43 Pages.
"Office Action and Search Report Issued in Chinese Patent Application No. 201780065887.4", dated Dec. 1, 2022, 18 Pages.
Rong, Bo, "The input method SwiftKey Neural using neural network technology is not black technology", Retrieved from: https://www.leiphone.com/category/zixun/ebKRb5gJBjyDsli4.html, Oct. 9, 2015, 5 Pages.
"Summons to Attend Oral Proceedings Issued in European Patent Application No. 16738856.0", dated Jun. 6, 2023, 7 Pages.
"Notice of Allowance Issued in Chinese Patent Application No. 201780065887.4", dated Jun. 19, 2023, 8 Pages.

* cited by examiner

NEURAL NETWORK HAVING INPUT AND HIDDEN LAYERS OF EQUAL UNITS

CROSS-REFERENCE TO RELATED APPLICATIONS

This is a national phase application in the United States of International Patent Application No. PCT/GB2016/052022, with an international filing date of Jul. 5, 2016, which claims priority of United Kingdom Application No. 1511887.0, filed on Jul. 7, 2015, the entire contents of which are incorporated herein by reference.

BACKGROUND

Modern mobile electronic devices, such as mobile phones and tablets, typically receive typed user input via soft keyboards, which include a variety of additional functionality beyond simply receiving keyboard input. One of these additional functions is the ability to predict the next word that a user will input via the keyboard given the previous word or words that were input. This prediction is typically generated using an n-gram based predictive language model, such as that described in detail in European Patent number 2414915.

One of the often criticised drawbacks of n-gram based predictive language models is that they rely on statistical dependence of only a few previous words. By contrast, artificial neural networks (ANNs), and recurrent neural network (RNN) language models in particular, have been shown in the art to perform better than n-gram models at language prediction (*Recurrent Neural Network Based Language Model*, Mikolov et al, 2010; *RNNLM—Recurrent Neural Network Language Modeling Toolkit*, Mikolov et al, 2011).

An artificial neural network is a statistical learning algorithm, the architecture of which is derived from the networks of neurons and synapses found in the central nervous systems of animals. ANNs are effective tools for approximating unknown functions that depend on a large number of inputs. However, in this context 'function' should be given its widest possible meaning as 'any operation that maps inputs to outputs'. ANNs are not only useful for approximating mathematical functions but also find wide use as classifiers, in data processing and robotics, among others.

In order to approximate these unknown functions, ANNs are trained on large datasets of known inputs and associated known outputs. The known inputs are input to the ANN and the values of various internal properties of the ANN are iteratively adjusted until the ANN outputs or approximates the known output for the known input. By carrying out this training process using large datasets with many sets of known inputs and outputs, the ANN is trained to approximate the underlying function that maps the known inputs to the known outputs. Often, ANNs that are used to approximate very different functions have the same general architecture of artificial neurons and synapses; it is the training process that provides the desired behaviour.

To date, it has not been practical to run an ANN on a mobile device due to their computational complexity and storage requirements. Neural networks, and neural network language models in particular, in the prior art have been designed to run on computers or servers with an abundance of storage space and processing power. Portable devices, such as mobile phones and tablets, typically have significantly less random access memory (RAM) and long-term non-volatile storage than a computer or server. The reduced resources available on a mobile device not only prevent large, complex applications including ANNs from executing with an acceptable level of performance, but their large size also discourages end-users from even installing the applications on their limited-storage devices.

There is, therefore, a need for an ANN predictive language model that is able to effectively run on a mobile device by providing a significant reduction in storage and memory requirements.

The embodiments described below are not limited to implementations which solve any or all of the disadvantages of known ANNs or ANN predictive language models.

SUMMARY

A first aspect of the invention provides an electronic device comprising a processor, at least one input interface, and an artificial neural network. The artificial neural network comprises an input layer, an output layer and at least first and second hidden layers. The number of units of the second hidden layer is equal to the number of units of the input layer. The processor is configured to generate one or more predicted next items in a sequence of items based on an input sequence item received at the at least one input interface by retrieving a context vector corresponding to the input sequence item using stored data; processing the context vector with the artificial neural network; retrieving an output vector at the output layer of the artificial neural network by transforming the output of the second hidden layer of the artificial neural network using at least some of the stored data, wherein the output vector corresponds to one or more predicted next items; and outputting the output vector.

Preferably, the processor is configured to process the context vector with the artificial neural network by providing the context vector to the input layer of the artificial neural network; multiplying the contents of the input layer with a first weight matrix $W_0$ and providing the result to the first hidden layer of the artificial neural network; processing the input to the first hidden layer with the nodes of the first hidden layer to produce an output of the first hidden layer; multiplying the output of the first hidden layer with a second weight matrix $W1$ and providing the result to the second hidden layer of the artificial neural network; and processing the input to the second hidden layer with the nodes of the second hidden layer to produce an output of the second hidden layer;

Additionally, the artificial neural network may further comprise a recurrent hidden vector. The recurrent hidden vector comprises data indicative of a previous state of the artificial neural network, allowing the artificial neural network to maintain a context relating to previous input items, improving the accuracy of its output.

If the artificial neural network comprises a recurrent hidden vector, the processor is configured to concatenate the contents of the input layer with the recurrent hidden vector, preferably by appending the contents of the input layer with the contents of the recurrent hidden vector, or vice versa, prior to processing the contents of the input layer with the hidden layers of the artificial neural network. The concatenated input layer and recurrent hidden layer are they processed by the first hidden layer of the artificial neural network. The processor is also configured to update the recurrent hidden vector according to the output of the first hidden layer, preferably by replacing the current recurrent hidden vector with the output of the first hidden layer.

Preferably, the processor is configured to retrieve the context vector by retrieving a row or column from the encoding matrix that corresponds to the input received at the at least one input interface. Alternatively, the processor may be configured to produce a 1-of-N vector corresponding to the input sequence item and to retrieve the context vector by transforming the 1-of-N vector using the encoding matrix, wherein transforming the 1-of-N vector comprises multiplying the 1-of-N vector and the encoding matrix using matrix multiplication.

Preferably, the processor is further configured to retrieve an output class prediction from the output layer of the artificial neural network, wherein the output class prediction defines a group of one or more sequence items, and also preferably, the processor is configured to restrict the transformation of the output of the second hidden layer with the encoding matrix to include only the one or more sequence items in the output class prediction.

The sequence of items that is the subject of the predication produced by the artificial neural network may be a sequence of one of more of: words, characters, morphemes, word segments, punctuation, emoticons, emoji, stickers, hashtags, and logogram character strokes.

Preferably, the at least one input interface is a keyboard, and wherein the input sequence item is one of: a word, character, morpheme, word segment, punctuation, emoticon, emoji, sticker, a hashtag, and keypress location on a soft keyboard.

The electronic device may further comprise a touch-sensitive display, wherein the keyboard is a soft keyboard and the processor is configured to output the soft keyboard on a display.

Preferably, the processor is further configured to determine one or more sequence predictions from the output vector; generate one or more display objects corresponding to the one or more sequence predictions; and output the one or more display objects on a display.

The one or more display objects may be selectable, and the processor may be configured to select the sequence item corresponding to the selected display object upon selection of one of the one or more display objects.

Preferably, the processor is configured to generate one or more further predicted items in the sequence of items based on the selected one of the one or more selectable display objects.

A second aspect of the invention provides a computer-implemented method for generating one or more predicted next items in a sequence of items based on an input sequence item. The method comprises the steps of receiving, at an electronic device, an input sequence item; retrieving, from stored data, a context vector corresponding to the input sequence item; processing the context vector with an artificial neural network, wherein the artificial neural network comprises an input layer, a first hidden layer, a second hidden layer and an output layer; retrieving an output vector at the output layer of the artificial neural network by transforming the output of the second hidden layer of the artificial neural network using at least some of the stored data, wherein the output vector corresponds to one or more predicted next items; and outputting the output vector, wherein the number of units of the second hidden layer of the artificial neural network is equal to the number of units of the input layer of the artificial neural network.

Processing the context vector with the artificial neural network preferably comprises providing the context vector to the input layer of the artificial neural network; multiplying the contents of the input layer with a first weight matrix $W_0$ and providing the result to the first hidden layer of the artificial neural network; processing the input to the first hidden layer with the nodes of the first hidden layer to produce an output of the first hidden layer; multiplying the output of the first hidden layer with a second weight matrix $W1$ and providing the result to the second hidden layer of the artificial neural network; and processing the input to the second hidden layer with the nodes of the second hidden layer to produce an output of the second hidden layer Preferably, the artificial neural network further comprises a recurrent hidden vector, and the method further comprises concatenating the contents of the input layer with the recurrent hidden vector prior to processing the contents of the input layer with the hidden layers of the artificial neural network.

The recurrent hidden vector comprises data indicative of a previous state of the artificial neural network, and, preferably, the recurrent hidden vector is updated according to the output of the first hidden layer. The recurrent hidden vector may be updated by replacing the recurrent hidden vector with the output of the first hidden layer.

Preferably, the step of retrieving a context vector comprises retrieving a row or column from the encoding matrix that corresponds to the input sequence item. Alternatively, prior to the step of retrieving a context vector, the method may further comprise the step of producing a 1-of-N vector corresponding to the input sequence item, and wherein the step of retrieving a context vector comprises transforming the 1-of-N vector with the encoding matrix. Transforming the 1-of-N vector may comprise multiplying the 1-of-N vector and the encoding matrix using matrix multiplication.

Prior to the step of retrieving an output vector, the method preferably comprises retrieving an output class prediction from the output layer of the artificial neural network, wherein the output class prediction defines a group of one or more sequence items. Following retrieving an output class prediction, at the step of retrieving an output vector, the transformation of the output of the second hidden layer with the encoding matrix is preferably restricted to include only the one or more sequence items corresponding to the output class prediction.

The sequence of items may be a sequence of one of more of: words, characters, morphemes, word segments, punctuation, emoticons, emoji, stickers, hashtags and logogram character strokes.

Preferably, the at least one input interface is a keyboard, and wherein the input sequence item is one of: a word, character, morpheme, word segment, punctuation, emoticon, emoji, sticker, a hashtag, and keypress location on a soft keyboard.

The method may further comprise the steps of determining one or more sequence predictions from the output vector; generating one or more display objects corresponding to the one or more sequence predictions; and outputting the one or more display objects on a display. Preferably, the one or more display objects are selectable, and the method further comprises, upon selection of one the one or more display objects, selecting the sequence item corresponding to the selected display object.

The method may also further comprise the step of generating one or more further predicted items in the sequence of items based on the selected one of the one or more display objects.

In a third aspect of the invention, a computer-readable medium is provided. The computer-readable medium contains instructions that, when executed by a processor, cause the processor to perform the steps of method.

DETAILED DESCRIPTION

Figure 1:
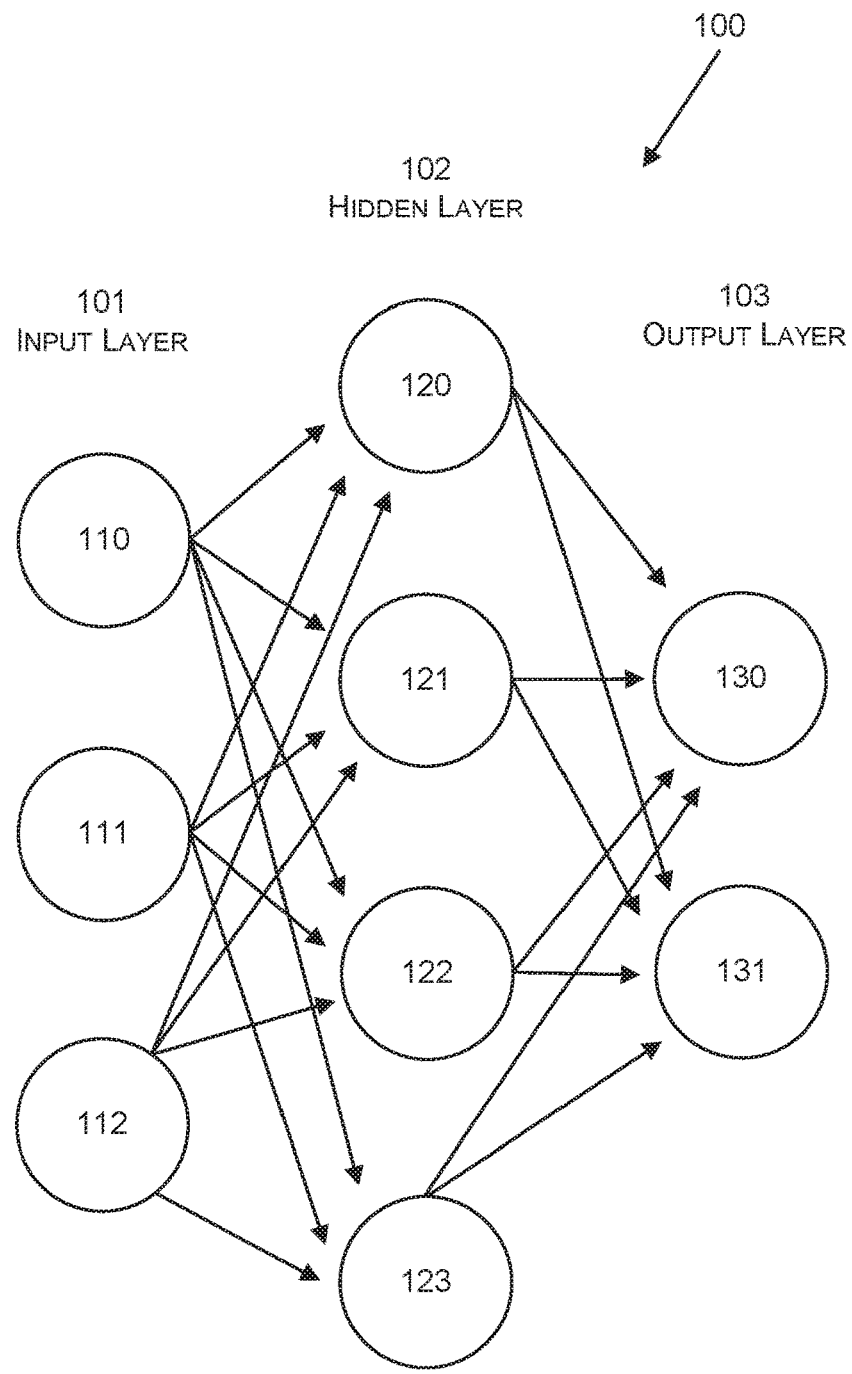
FIG. 1 depicts an example feedforward artificial neural network according to the prior art.

FIG. 1 depicts a simple ANN 100 according to the state of the art. Essentially, an artificial neural network, such as ANN 100, is a chain of mathematical functions organised in directionally dependent layers, such as input layer 101, hidden layer 102, and output layer 103, each layer comprising a number of units or nodes, 110-131. ANN 100 is known as a 'feedforward neural network', since the output of each layer 101-103 is used as the input to the next layer (or, in the case of the output layer 103, is the output of the ANN 100) and there are no backward steps or loops. It will be appreciated that the number of units 110-131 depicted in FIG. 1 is exemplary and that a typical ANN includes many more units in each layer 101-103.

In the operation of the ANN 100, input is provided at the input layer 101. This typically involves mapping the real-world input into a discrete form that is suitable for the input layer 101, i.e. that can be input to each of the units 110-112 of the input layer 101. For example, ANNs such as ANN 100 can be used for optical character recognition (OCR). Each unit 110-112 of the input layer may correspond to a colour channel value for each pixel in a bitmap containing the character to be recognised.

After input has been provided to the input layer 101, the values propagate through the ANN 100 to the output layer 103. Each of the units of the hidden layer 102—so called because its input and output is contained within the neural network—is essentially a function that takes multiple input values as parameters and returns a single value. Taking unit 120 of hidden layer 102, for example, the unit 120 receives input from units 110, 111 and 112 of the input layer 101 and produces a single output value that is then passed to units 130 and 131 of the output layer 103.

The units 130 and 131 of the output layer 103 operate in a similar manner to those of the hidden layer 102. Each unit 130 and 131 of the output layer 103 receives input from all four units 120-123 of the hidden layer 102, and outputs a single value. The outputs of the output layer, like the inputs to the input layer are discrete values that are somehow mapped to real-world quantities. In the OCR example, the output layer 103 may have a unit corresponding to each character that the ANN 100 is capable of recognising. The recognised character can then be indicated in the output layer 103 by a single unit with a value of 1, while the remaining units have a value of zero. In reality, the ANN 100 is unlikely to provide an output as clean as this, and the output layer 103 will instead have multiple units with various values, each indicating a probability that the input character is the character associated with that unit.

Figure 2:
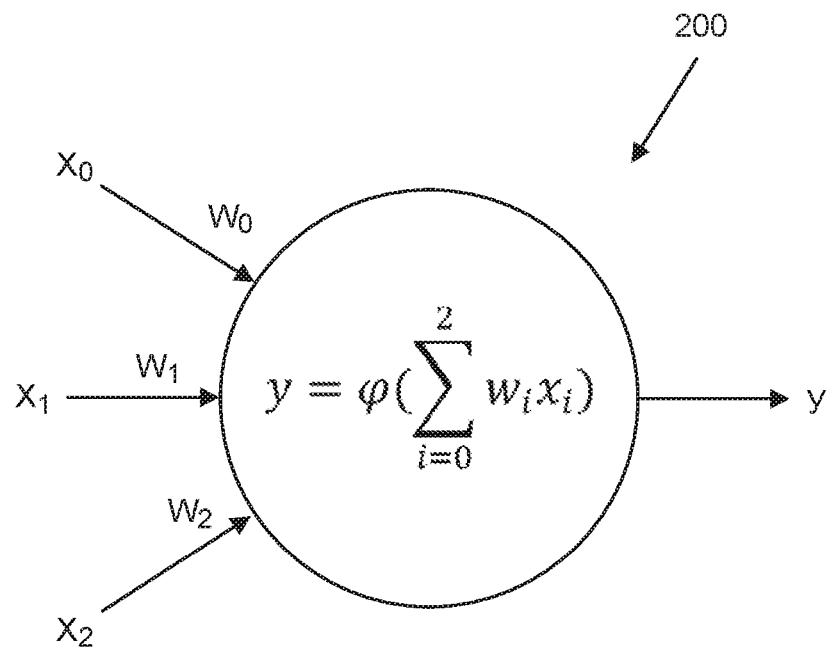
FIG. 2 depicts an example unit of a layer of an artificial neural network according to the prior art.

The operation and configuration of the units 120-131 of the hidden layer 102 and output layer 103 is now described in more detail with respect to FIG. 2. The unit 200 of FIG. 2 may be one of the units 120-131 of the ANN 100 described above. The unit 200 receives three inputs $x_0$, $x_1$ and $x_2$ from units in the preceding layer of the ANN. As these inputs are received by the unit 200, they are multiplied by corresponding adaptive weight values $w_0$, $w_1$ and $w_2$. These weight values are 'adaptive' because these are the values of the ANN that are modified during the training process. It will be appreciated that the values $x_0$, $x_1$ and $x_2$ are generated by the units of the preceding layer of the neural network and are, therefore, dependent on the input to the neural network. The adaptive weight values $w_0$, $w_1$ and $w_2$ are independent of the input, and are essential for defining the behaviour of the ANN.

After the inputs $x_0$, $x_1$ and $x_2$ are multiplied by the adaptive weight values, their products are summed and used as input to a transfer function $\varphi$. The transfer function $\varphi$ is often a threshold function such as a step function, which is analogous to a biological neuron in that it 'fires' when its input reaches a threshold. Other transfer functions may be and are often used, such as the sigmoid activation function, the softmax function, and linear combinations of the inputs. The output of the transfer function $\varphi$ is the output of the unit 200.

As mentioned above, the ANN 100 is trained using large sets of data with known inputs and known outputs. For example, if the ANN 100 is to be used to predict the next word in a sentence, taking the current word as input, the ANN 100 can be trained using any suitable body of text. A common algorithm that is used to train ANNs is the backward propagation of errors method, often referred to as simply backpropagation. Backpropagation works by adjusting the adaptive weights, for example $w_0$, $w_1$ and $w_2$ of FIG. 2, to minimise the error or discrepancy of the predicted output against the real output. A detailed description of the backpropagation algorithm can be found at Chapter 7 of *Neural Networks—A Systematic Introduction* by Raul Rojas, published by Springer Science & Business Media, 1996.

Figure 3:
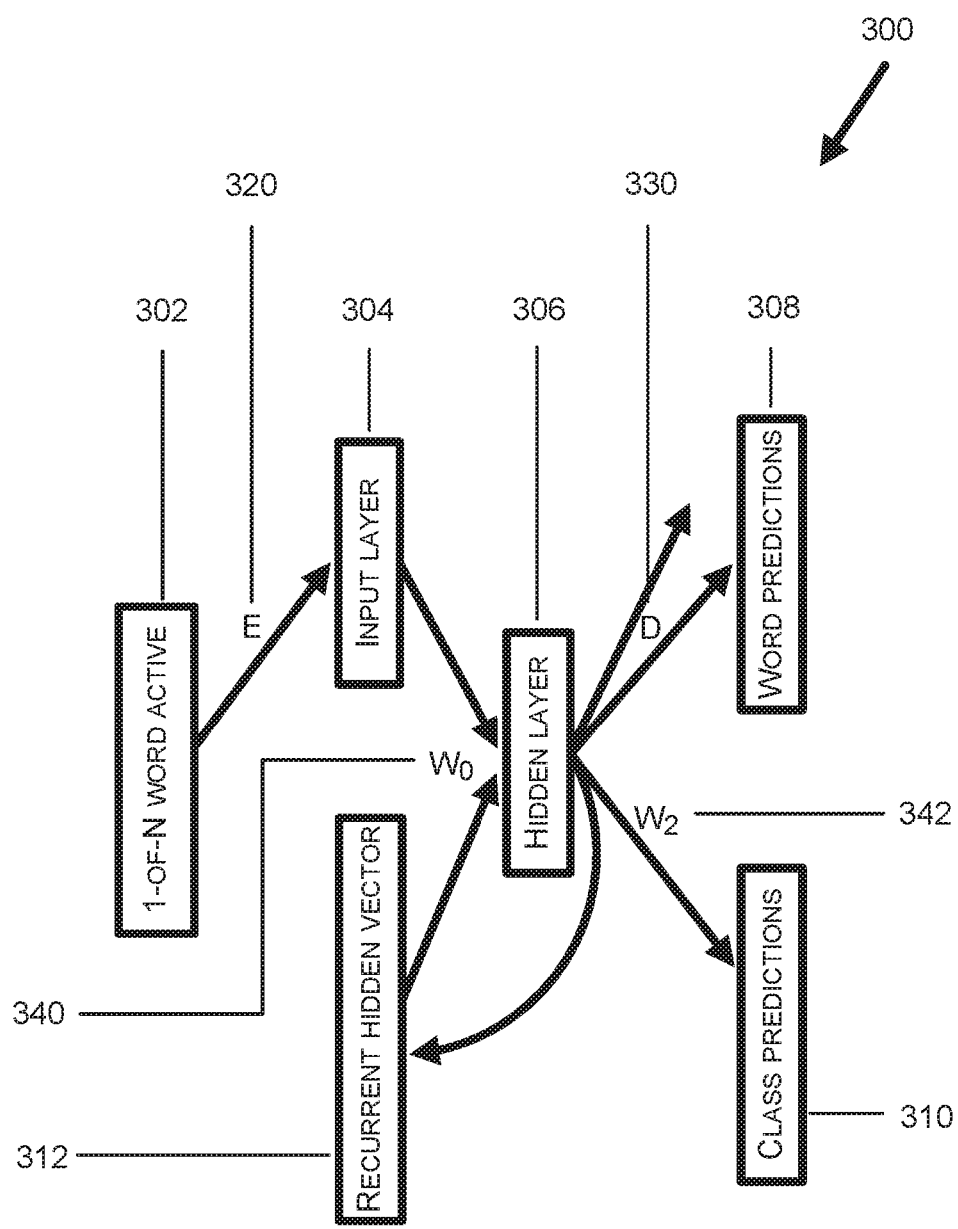
FIG. 3 depicts a prior art recurrent neural network used for predictive language modelling.

FIG. 3 depicts an ANN 300 as described by Mikolov et al. in "*RNNLM—Recurrent Neural Network Language Modeling Toolkit*", 2010. The ANN 300 is used to predict the next word in textual data given a context, taking a current word as its input and producing a predicted next word as its output.

Like the ANN 100, the ANN 300 comprises an input layer 304, a hidden layer 306, and an output layer 308. As with a typical ANN, the ANN 300 comprises adaptive weights in the form of a first weight matrix 340 that modifies the values of the units of the input layer 304 as they are passed to the hidden layer 306. The ANN 300 also includes an encoding matrix 320 and a decoding matrix 330. The encoding matrix 320 maps the real-world words into a discrete form that can be processed by the units of the ANN 300. The decoding matrix 330 modifies the values of the units of the hidden layer 106 as they are passed to the output layer 108 to turn the result of the ANN 300's processing into a real-world word.

Words input to the ANN 300 are represented in 1-of-N form 302, i.e. a series of N bits, all having a value of 0 except for a single bit having a value of 1. The N different 1-of-N vectors, each with a unique position of the 1 bit, map to words in a predefined vocabulary. The 1-of-N representation 302 is modified by the encoding matrix 320 to provide the values of the input layer 304.

In addition to the input, hidden and output layers of a typical feedforward ANN, the ANN 300 also comprises a recurrent hidden vector (RHV) 312. With each pass of the ANN 300, before the values of the units of the input layer 304 are modified by the weight matrix 340, the values of the units of the RHV 312 are concatenated with the values of the units of the input layer 304. The term 'concatenated' as used here has the standard meaning in the art: the values of the units of RHV 312 are appended to the values of the units of the input layer 304, or vice versa. The concatenated values of the units of the input layer 304 and RHV 312 are then multiplied by the first weight matrix 340 and passed to the hidden layer 306. Following each pass of the ANN 300, the values of the units of the hidden layer 306 are copied to the RHV 312, replacing the previous RHV. By introducing the RHV 312, the ANN 300 is able to maintain the context of previous predicted words between predictions, improving the accuracy of the system when used in an inherently context-based application such as language modelling.

When the softmax activation function is used in the output layer 308, the values of the units of the output layer 308 represent the probability distribution of the next word given the input word and, via the RHV 312, the state of the hidden layer at the previous pass.

The ANN 300 may also comprise a class prediction output 310. By multiplying the values of the units of the hidden layer 306 by a second weight matrix 342, a word class prediction is provided, where the classes are logical groupings of possible output words.

The encoding matrix 320 and decoding matrix 330 must encode the whole vocabulary available to the ANN 300, and therefore make up the majority of the size of a neural network on disk and in memory. In general, the encoding and decoding matrices make up approximately 80% of the size of the ANN.

The present invention provides a new framework for an ANN predictive language model that is able to run effectively on a mobile device by providing a significant reduction in storage and memory requirements with little, if any, corresponding loss in accuracy. The improvement is achieved by providing a second hidden layer having the same dimensions as the input layer enabling the same matrix to be used as both the encoding and decoding matrix.

Since the encoding and decoding matrices consume most of the required storage and have the largest memory requirements, using the same matrix for both purposes leads to a reduction in size of approximately 40%. This enables a reduction of download costs for both the software provider and the user, a reduction in storage space required on the phone, and a reduction of RAM usage and requirements.

Figure 4:
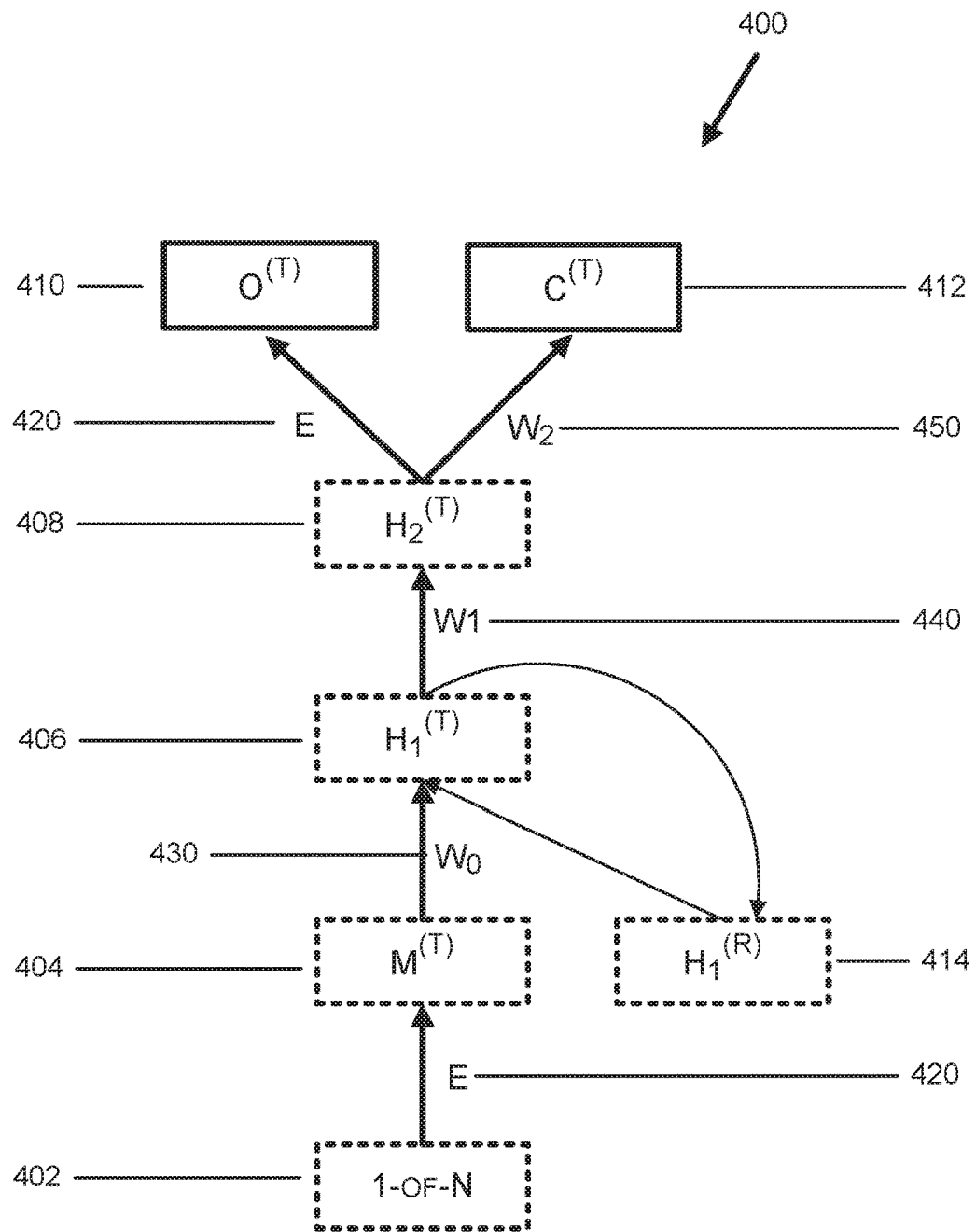
FIG. 4 depicts an artificial neural network in accordance with the present invention.

FIG. 4 depicts an example ANN 400 in accordance with the present invention. The ANN 400 comprises an input layer 404, a first hidden layer 406, a second hidden layer 408, and an output layer 410. In accordance with the present invention, the second hidden layer 408 has the same dimensions as the input layer 404, i.e. the second hidden layer 408 and input layer 404 have the same number of units.

The ANN 400 may comprise more than two hidden layers, as long as the final hidden layer has the same number of units as the input layer 404.

The ANN 400 generates one or more predicted next items in a sequence of items based on an input sequence item, for example predicting the next word that a user may wish to include in a sentence based on the previous word that the user has input to the system. The following description is presented with respect to the specific embodiment of predicting the next word in a sequence of words, but it will be appreciated that the disclosure can be readily generalised to other sequences of items with no changes to the architecture of the ANN 400 by training the ANN 400 on different sets of data. For example, the same ANN 400 could be used to predict the next item in a sequence of items, for example: words, characters, logogram character strokes, e.g. Hanzi, morphemes, word segments, punctuation, emoticons, emoji, stickers, and hashtags, or optical character recognition or user intention prediction. For example, if the input to the ANN 400 is an operating system or software application event, the ANN 400 may generate a prediction of the next action that a user might wish to carry out, e.g. if the event that occurs is an application opening, the ANN 400 may predict that the user is most likely to open a particular document subsequently. The generated prediction may then, for example, be used to present the user with the option of opening the particular document more prominently or before any other options are presented.

In one embodiment, the input word to the ANN 400 is represented by a 1-of-N vector 402. All N elements of the 1-of-N vector 402 have a value of 0, except for a single element which has a value of 1. The position of the 1 element corresponds to the input word. The layers 404-410 of ANN 400 operate on a context vector representation of the input word which is generated by transforming the 1-of-N vector 402 with the encoding matrix 420. Typically, this transformation is a matrix multiplication; however, it will be appreciated that other suitable methods and variations of matrix multiplication may be used instead. The context vector resulting from the transformation of the 1-of-N vector 402 is then used as the input to the input layer 404 of the ANN 400.

If the ANN 400 is used for a purpose other than predicting the next word in a sequence, the appropriate input to the ANN 400 will be represented by the 1-of-N vector 402 instead. For example, if the ANN 400 is used to predict the next morpheme, the 1-of-N vector 402 will represent the input morpheme. Similarly, if the ANN 400 is used to predict the next character, the 1-of-N vector 402 will represent the input character.

It will be appreciated that matrix multiplication of a 1-of-N vector with a N×m or m×N matrix such as encoding matrix E 420 is equivalent to selecting a single row or column from the encoding matrix E 420 to produce a single m-dimensional vector. Accordingly, an ANN according to the present invention need not actually include a 1-of-N vector 402 or the means for transforming the 1-of-N vector 402 with the encoding matrix E 420—on a pass of the ANN 400 a context vector may be retrieved for an input word by simply selecting the row or column of the encoding matrix E 420 that corresponds to the input word.

Each row of the encoding matrix E 420 may correspond to a word in the system dictionary, e.g. the dictionary used by the operating system of the device on which the ANN 400 runs, or a dictionary used by a soft keyboard application that utilises the ANN 400. The first row of the encoding matrix E 420 corresponds to the word that has been assigned ID 1, the second row corresponds to the word that has been assigned ID 2, etc. Each row of the encoding matrix E 420 is of size m, which is the context vector size. The size m of each row is determined before the ANN 400 is put into use, when training is carried out, based on tests. A lower number of columns reduces the computational complexity of carrying out operations with the encoding matrix E 420. However, the matrix E 420 must have a high enough number of columns m to encode the input sequence items that each row represents. Various values for m can be used, but m is fixed for any given trained ANN 400. Preferably, the number of columns m is less than or equal to 128, which has been experimentally shown to provide a good balance between encoding and computational complexity. If the electronic device on which the ANN 400 runs has less available computational resources, for example a less-powerful processor or less memory, the optimum balance between computational complexity and accuracy may result in a lower number of columns m. The number of rows is preferably fixed to dictionary size, though it will be appreciated that words may be grouped together, or left out altogether from the encoding matrix E 420. It will be appreciated that the above discussion applies equally, with the necessary switching of 'row' and 'column', to the alternative in which each column corresponds to a word in the system dictionary.

Once a context vector has been generated from the encoding matrix E 420, the context vector is processed by the ANN 400. The values of the units of the input layer 404 are multiplied by adaptive weights $W_0$ 430 and summed at each unit of the first hidden layer 406. The sum of weighted outputs of the input layer 404 units is used as the input to a transfer function. Any suitable transfer function, such as the sigmoid activation function or softmax activation function, may be used. It will be appreciated that the summation of the weighted outputs of the units of the input layer 404 by the first hidden layer 406 can be carried out by a matrix multiplication of the 1×m context vector with a m×$H_1$ first weight matrix $W_0$ 430, where $H_1$ is the number of units of the first hidden layer 406. The transfer function of the first hidden layer 406 is then applied to each element of the 1×$H_1$ vector resulting from the multiplication of the context vector with the first weight matrix $W_0$ 430, the result of the transfer function being the output of the first hidden layer 406, which can itself be represented by a 1×$H_1$ vector.

In a preferred embodiment of the invention, the ANN 400 further comprises a recurrent hidden vector (RHV) 414; however, it will be appreciated that the ANN 400 will still function without a RHV. Following each pass of the ANN 400, the output of the first hidden layer 406 is copied to the RHV 414. It will be appreciated that an actual action of copying the output of the first hidden layer 406 to the RHV 414 within the memory of a mobile device, computer or other electronic device is not necessarily carried out when the invention is put into effect. For example, a pointer to the current RHV 414 may be stored in memory and updated at each pass of the ANN 400 to point to the location in the memory of the electronic device where the most-recently generated output of the first hidden layer 406 is stored. Furthermore, it will be appreciated that the action of 'updating' the recurrent hidden vector, whether that be by copying, modifying a pointer, or by any other suitable means, may occur at any time after the output of the first hidden layer 406 has been generated.

When the present invention is put into effect in this way, the RHV 414 maintains context information about the previous state of the system, i.e. previously input sequence items, improving the capability of the ANN 400 to provide accurate predictions.

When a RHV 414 is used, prior to the operation of the first hidden layer 406 on the context vector, the context vector is concatenated with the RHV 414. This can be represented mathematically as a 1×(m+$H_1$) vector, containing the elements of both the context vector and the RHV 414. The concatenated vector is then multiplied by a (m+$H_1$)×$H_1$ first weight matrix $W_0$ 430 to produce the 1×$H_1$ vector on which the activation function operates, generating the output of the first hidden layer 406.

Once the output of the first hidden layer 406 is generated, the values of each unit of the first hidden layer 406 are again multiplied by adaptive weights, summed and used as the input to the transfer function at the units of the second hidden layer 408. As for the first hidden layer 404, the function of the second hidden layer can be carried out as the operation of a transfer function on the product of a matrix multiplication. The 1×$H_1$ vector that represents the output of the first hidden layer 406 is multiplied by a $H_1$×$H_2$ second weight matrix $W_1$ 440, where $H_2$ is the number of units of the second hidden layer 408. Since the second hidden layer has the same dimensions as the input layer, $H_2$=m. The activation function for the second hidden layer 408, again preferably a sigmoid activation function, although any other appropriate transfer function may be used, is applied to the resulting 1×m vector of the matrix multiplication to produce the output of the second hidden layer 408.

The number of units of the first hidden layer 406 is preferably larger than the number of units of the second hidden layer 408; however, it is not strictly necessary for the number of units of the first hidden layer 406 to be larger, particularly when the ANN 400 comprises more than two hidden layers.

Since the input layer and second hidden layer have the same dimensions, the same encoding matrix 420, or its transpose, can be used to both encode the 1-of-N representation of the word 402 into a form suitable for processing by the ANN 400 and decode the output of the second hidden layer 408 to provide the probability distribution of the output layer 410. Thus, the output of the second hidden layer 408 is transformed with the encoding matrix 420 and operated on by a final activation function, preferably the softmax activation function, although any other appropriate transfer function such as the sigmoid activation function may be used if correctly normalised, to produce the output vector 410. The output vector 410 corresponds to a probability distribution for the next word given the input word, where the value of each element of the output vector 410 corresponds to the probability that the next word is the word corresponding to the position of that element in the output vector 410.

In a preferred embodiment, the output layer of the ANN 400 may also comprise a class-based output 412 in addition to the output vector 410. To generate the class-based output 412, the outputs of the units of the second hidden layer 408 are multiplied by adaptive weights $W_2$ 450, summed, and used as inputs to a transfer function, preferably the softmax activation function, but again any other appropriate transfer function such as an appropriately normalised sigmoid activation function may be used. Like the first hidden layer 406 and second hidden layer 408, the operation of the class-based part of the output layer 412 can be represented by a matrix multiplication of the output of the second hidden layer 408 and a third weight matrix $W_2$ 450. The resulting vector is used as input to the transfer function to produce the output of the class-based part of the output layer 412.

The class-based output is used to predict a word class—grouping related words. Classes may group words according to the frequency with which they appear in the training texts or may group words according to semantic or syntactic similarity, or group words according to alphabetical order, for example. The use of the class-based output 412 may reduce the computation involved in the prediction process. For example, when the ANN 400 is making a prediction, it first finds the predicted class using the third weight matrix $W_2$ 450, which is much smaller than the encoding matrix 420, potentially by several orders of magnitude. The class-based output can then be used to restrict the calculation of the most-probable words to words in one or more output classes.

The softmax function is given by:

$$\sigma(z)_k = \frac{e^{z_k}}{\sum_{l=1}^{L} e^{z_l}}$$

where z is a L-dimensional vector. If classes are not used, the vector z is the same size as the dictionary, i.e. L is the number of words in the dictionary. The number of words in the dictionary is typically of the order $10^4$; hence, the sum in the denominator of the equation is particularly complex and, therefore, computationally demanding.

However, the output probability $P(w_i)$ of a word $w_i$ can be re-expressed as:

$$P(w_i) = P(c_j)P(w_i|c_j)$$

where c is a word class, i is the index of word $w_i$, and j is the index of the class to which word $w_i$ belongs to. Hence, if classes are used, the softmax function of the output layer can be split into two parts. First, the softmax function is calculated over each of the classes to produce a vector $\sigma(c)$ that provides the probabilities for each of the word classes, $P(c_j)$. Second, for a given word class, a second vector $\sigma(w)_j$ is calculated with the softmax function over only the words $w_i$ in that class, providing the probabilities $P(w_i|c_j)$. Preferably, the vector $\sigma(w)_j$ is calculated for more than one class $c_j$, for example for each of the three classes with the highest values in the vector $\sigma(c)$, i.e. the highest probabilities $P(c_j)$.

If, for example, a dictionary of 10,000 words is divided into 100 classes, each containing 100 words, and probabilities are calculated for words in the top three classes, the calculation of the softmax function is simplified, requiring only four sums of 100 exponentiated values to be calculated (one for vector $\sigma(c)$, and one further sum to calculate vector $\sigma(w)_j$ for each of the three classes $c_j$), rather than a sum of 10,000 exponentiated values.

Figure 5:
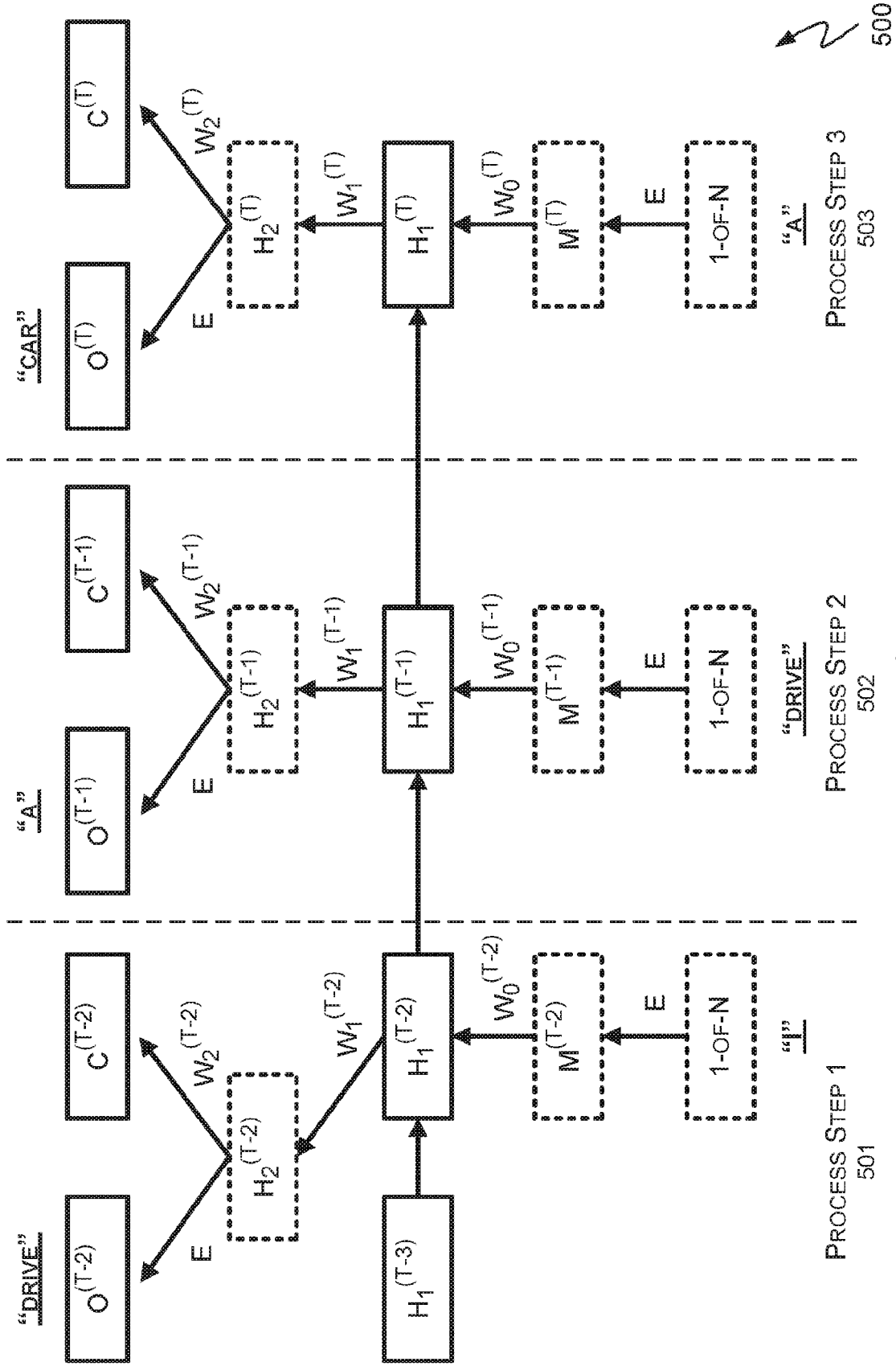
FIG. 5 depicts an example process of predicting the words in a sentence using an artificial neural network in accordance with the present invention.

FIG. 5 depicts an example of the ANN 400 processing the text "I drive a car", starting with the input "I". The superscript t notation shown in the figure indicates a time step of the process. The time t is the final time step in the process, after the sentence "I drive a car" has been processed, t−1 is the preceding time step, t−2 the time step preceding that, and so on. In this example, a class-based output is employed, although this is optional.

The depicted process begins at step 501, and time t−2. The ANN 400 has context information learned from the previous state of the system, including knowledge of past inputs and the previous text entered and stored in RHV $H_1^{(t-3)}$. When the user enters the letter "I" followed by a space, the 1-of-N dimensional vector for the context word, "I", is multiplied with the encoding matrix, E, producing a context vector $M^{(t-2)}$. As mentioned above, this step is not necessary. Preferably, the row or column of the encoding matrix E corresponding to the word "I" may simply be selected without generating a 1-of-N vector and multiplying it with the encoding matrix E. The context vector $M^{(t-2)}$ is concatenated with the RHV $H_1^{(t-3)}$, which represents the previous state of the ANN, and multiplied with the first weight matrix $W_0^{(t-2)}$ to form the first hidden layer, $H_1^{(t-2)}$. The output of the hidden layer, $H_1^{(t-2)}$, is used as of the next iteration of the RHV $H_1^{(t-2)}$, as indicated by the arrow linking the first hidden layer of process step 501 to process step 502.

The output of the hidden layer $H_1^{(t-2)}$ is also multiplied with the second weight matrix $W1^{(t-2)}$ and operated on by the activation function of the second hidden layer to produce the output of the second hidden layer $H_2^{(t-2)}$. As mentioned above, this hidden layer has the same dimensionality as the context word vector $M^{(t-2)}$. Next, the output of the second hidden layer $H_2^{(t-2)}$ is multiplied by weight matrix $W_2^{(t-2)}$ and fed into the activation function to predict a word class $C^{(t-2)}$. The output of the second hidden layer $H_2^{(t-2)}$ is then multiplied with the encoding matrix E to get the actual N-dimensional word prediction $O^{(t-2)}$, with the calculation of the output probabilities using the softmax function limited to the most-probable one or more classes. In this case, the predicted next word could be the word "drive".

If the user has selected the word "drive" following process step 501, the input word to the second process step 502 is "drive". The 1-of-N dimensional vector for the word "drive" is multiplied with the encoding matrix E, or the relevant row or column of E is selected to produce a context vector $M^{(t-1)}$. The context vector is concatenated with the recurrent hidden vector, which is the first hidden layer of the previous state, $H_1^{(t-2)}$. The concatenated vector is multiplied with the weight matrix $W_0^{(t-1)}$ and fed into the activation function to produce the output of the first hidden layer $H_1^{(t-1)}$. The output of the first hidden layer $H_1^{(t-1)}$ is copied to the recurrent hidden vector to be used in subsequent process steps.

The output of the first hidden layer $H_1^{(t-1)}$ is multiplied with the second weight matrix $W_1^{(t-1)}$ and fed into the activation function to generate the output of the second hidden layer $H_2^{(t-1)}$. Next, the output of the second hidden layer $H_2^{(t-1)}$ is multiplied by the third weight matrix $W_2^{(t-1)}$ and fed into the activation function to predict a word class $C^{(t-1)}$. The output of the second hidden layer $H_2^{(t-1)}$ is then multiplied with the encoding matrix E to get the actual N-dimensional word prediction $O^{(t-1)}$, with the calculation of the output probabilities using the softmax function limited to the most-probable one or more classes. In this case, the predicted next word could be the word "a".

Once again, if the user selects the word "a" following process step 502, the input word to the third process step 503 is "a". The 1-of-N dimensional vector for the word "a" is multiplied with the encoding matrix E, or the relevant row or column of E is selected to produce a context vector $M^{(t)}$. The context vector is concatenated with the recurrent hidden vector, which is the first hidden layer of the previous state, $H_1^{(t-1)}$. The concatenated vector is multiplied with the first weight matrix $W_0^{(t)}$ and fed into the activation function to produce the output of the first hidden layer $H_1^{(t)}$. The output of the first hidden layer $H_1^{(1)}$ is copied to the recurrent hidden vector to be used in future process steps.

The output of the first hidden layer $H_1^{(t)}$ is multiplied with the second weight matrix $W_1^{(t)}$ and fed into the activation function to generate the output of the second hidden layer $H_1^{(t)}$. Next, the output of the second hidden layer $H_2^{(t)}$ is multiplied by the third weight matrix $W_1^{(t)}$ and fed into the activation function to predict a word class $C^{(t)}$. The output of the second hidden layer $H_2^{(t)}$ is then multiplied with the encoding matrix E to get the actual N-dimensional word prediction $O^{(t-1)}$, with the calculation of the output probabilities using the softmax function limited to the most-probable one or more classes. In this case, the predicted next word could be the word "car".

Entry of a full stop may indicate the end of the sentence to the system. Preferably, full stops and other punctuation is treated similarly to any words, i.e. punctuation items are valid predictions that can be produced by the ANN 400 when they are appropriate. Hence, punctuation is automatically taken into account as part of the context to be used for any subsequent predictions, since by storing the RHV $H_1^{(t)}$, the ANN 400 is able to use the context of this sentence to help with predictions for further sentences.

Like all ANNs the ANN 400 must be trained on training data before it is capable of accurately predicting the next word or other item in the sequence. ANN 400 is trained by feeding selected texts into the system. The selected texts may be personalised for a particular end-user, using a corpus of written words that have been written by that user, for example social media posts, emails, and text messages. The ANN 400 may be initially trained using standard texts before training using end-user generated text or as an alternative to using end-user generated text. The values of the first, second and third weight matrices 430, 440 and 450 and encoding matrix 420 are modified accordingly to give the system a base level of accuracy.

The ANN 400 further increases accuracy by continuously learning as the user selects words from among candidates presented on the selection bar on the mobile device, personalising the predictions for the user. The predicted next words generated by the ANN 400 with the highest probability may be output and the appropriate word selected by a user. Alternatively, if none of the predicted words output to a user are the correct prediction, the user may continue to enter the word manually. Whichever of these two processes occurs, the system knows both the input word, and the correct output word. Hence, as the ANN 400 is used, it can be continually trained to improve its accuracy.

It will be appreciated that a general ANN according to the present invention that predicts the next item in a sequence of items, rather than words specifically, can be trained using any suitable selection of data with well-defined known inputs and corresponding known outputs.

Training of the ANN 400 uses a modified version of the backpropagation algorithm known as the backpropagation through time (BPTT) algorithm. The backpropagation through time algorithm is described in detail in *Neural Networks—A Systematic Introduction* by Raul Rojas at chapter 7.4.1. The BPTT algorithm used to train ANN 400 is a modified version of the algorithm described by Rojas. In particular, the algorithm is modified in one of two ways:

1. The encoding matrix 420 is modified in the output layer after each forward pass. The error derivatives are calculated backwards until the first hidden layer 406 and then stored. When the end of the chosen time window is reached, backpropagation through time can be performed. Error derivatives are carried on to previous time steps, and the error is backpropagated down to the input layer. At this point the encoding matrix 420 can be updated according to the error derivatives in the input layer. This method has the advantage that all updates are done as soon as possible—each step is able to already make use of the updated weights from the previous step. The top half of the network as depicted in FIG. 3, i.e. the path from input, through matrix E, the hidden layers and through the encoding matrix E again to the output, is updated at each forward pass, together with the encoding matrix. The bottom half, i.e. the weight matrix $W_O$ for the recurrent hidden vector, is updated at the end of the window, together with the second set of updates to the encoding matrix.
2. Forward passes are performed at each step but without any updates. All the updates are performed at the end of the time window, during back-propagation through time. This includes first, second and third weight matrices 430, 440 and 450 and all updates to the encoding matrix 420. Error derivatives are first calculated at all points in the time window and then averaged and used for updating the weights. The benefit of this approach is that all the weight updates are averaged over all the time steps in the selected time window, possibly leading to smoother and more stable updates.

The ANN 400 is typically located on an electronic device, for example a smartphone or tablet computer. The electronic device comprises at least one input interface, for example a touch sensitive display or a hard or soft keyboard, a processor, and the ANN 400. Input to the ANN 400 is provided via the input interface, and the output predictions of the ANN 400 may be output on a graphical user interface of the electronic device.

The processor of the electronic device is configured to process the input received at the input interface with the ANN 400 to produce the one or more predicted next items in the sequence. The ANN 400 is preferably stored as computer-readable instructions in a memory associated with the electronic device, where the instructions can be accessed and executed by the processor.

Preferably, the input interface is a soft keyboard that operates on a touch-sensitive display of a mobile phone or tablet computer. The user of the electronic device first inputs a word to a text field using the soft keyboard, then enters a space character or punctuation. The space character or punctuation indicates to the keyboard software that the user has completed inputting the word. As an alternative to a space character or punctuation, the end of a word may be indicated by selection of a suggested correction or word completion. The keyboard software then utilises the ANN 400 to generate multiple predictions for the next word based on the input word. A pre-defined number, for example three or four, of most-likely predictions output by the ANN 400 (i.e. the words correspond to the units of the output layer with the highest values are then displayed on the touch-sensitive display, preferably concurrently with the keyboard, and preferably before the user begins to input the next word. The user may then select one of the displayed word predictions, prompting the keyboard to input the selected word into the text field. Once a word has been selected by a user, the selected word is then input to the ANN 400 and further predicted words are generated and displayed. Alternatively, if none of the word predictions presented to the user were correct, the user may continue to input the next word using the keys of the soft keyboard.

If none of the displayed predictions are selected by the user of the electronic device, and instead the user proceeds to input the next word manually, the predictions for the current word that were generated by the ANN are filtered by a filtering module according to the characters or other symbols that are input, and the displayed predictions may be updated according to the words with the highest probability that match that filter, using techniques that are known in the art. For example, taking the sentence discussed above with respect to FIG. 5, 'I drive a car', it is possible that the ANN 400 will not correctly predict that 'car' is the most likely or one of the most likely next words given the input sequence item. In such a scenario, the word 'car' would not be presented to the user such that they could select it as the correct prediction. If the correct prediction is not presented to the user, the user may begin to type the next word, i.e. 'car', into the electronic device. As the user types the letters of the word, the list of predictions generated by ANN 400 is filtered. For example, as the user types the letter 'c' of 'car', the list of predictions is filtered to include only words beginning with the letter 'c'. As the list of predictions is filtered, the predictions that are presented to the user may be updated, with predictions that do not match the filter being replaced by the next-most-likely predictions which do match the filter.

It will be appreciated that the filtering of predictions may be based on other factors than the characters that are typed. For example, if the user begins typing, implying that none of the displayed predictions are appropriate, the filter may simply discount the displayed predictions and the next-most-likely predictions may be displayed instead without taking into account which specific characters were typed. Alternatively, the filter may take into account that key presses can be inaccurate, and may expand the filter to include characters that are adjacent to or close to the typed character on the keyboard.

Figure 6:
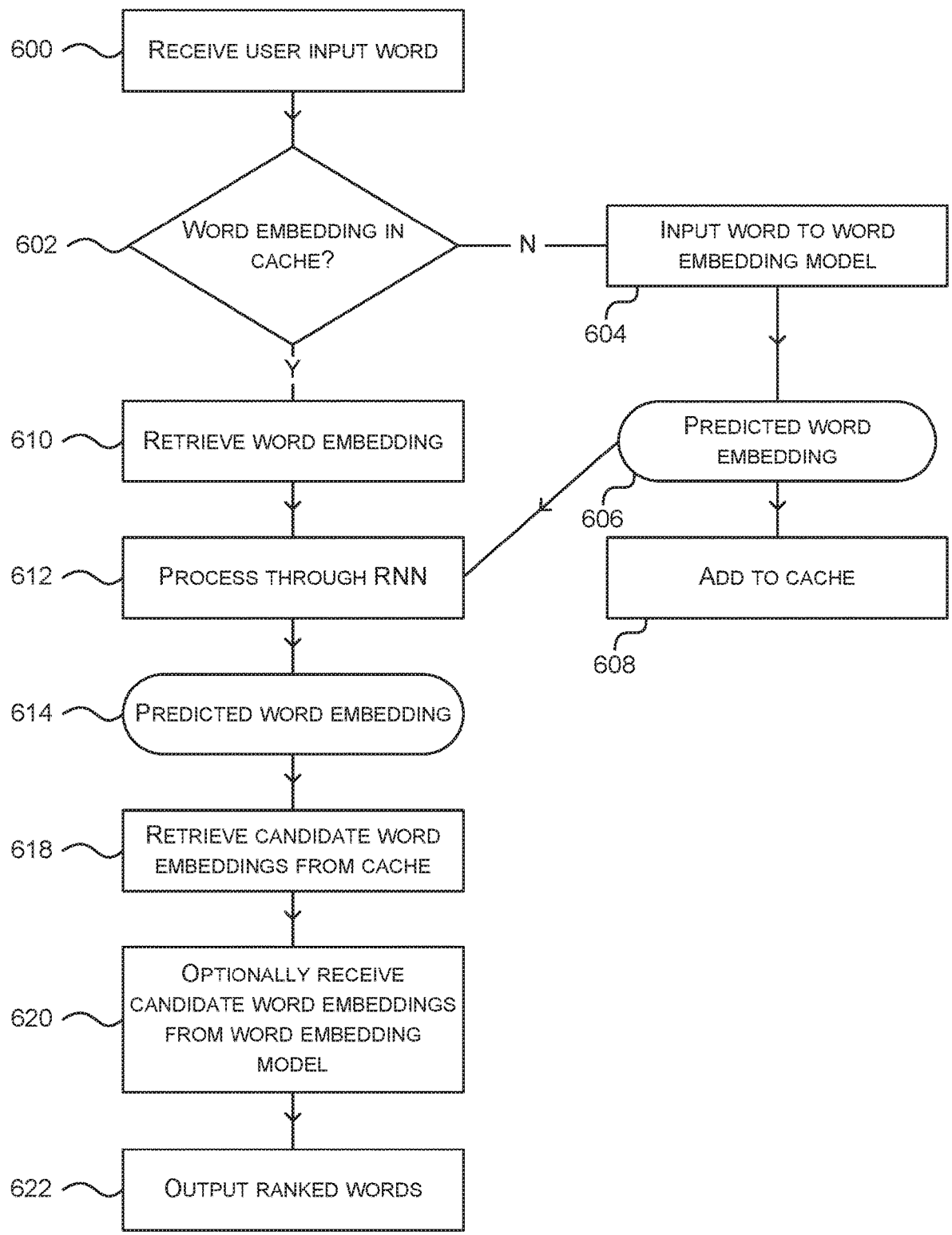
FIG. 6 is a flow diagram of a method of operation at an electronic device having an artificial neural network.

FIG. 6 is a flow diagram of a method of operation at an electronic device, such as a smart phone, tablet computer, head worn computer, or other computing device having an artificial neural network such as the artificial neural network of the examples described herein. The method is implemented using any one or more of software, firmware, hardware at the device. An example of the electronic device is described in more detail below with reference to FIG. 7.

The method of FIG. 6 is a prediction time method, also referred to as a test time method, where a trained neural network is being used to generate predictions for new examples not previously seen by the neural network. In the situation of FIG. 6 the predictions are predictions of words. However, this is not essential as the method is applicable to predicting any items which are in a sequence. In some cases the items are decomposable into characters or other smaller units.

The electronic device receives 600 a word input by a user such as by typing on a soft keyboard to input characters into a text input box on a graphical user interface. Other methods of input are used in some examples, such as speech input, gesture input or others.

The electronic device checks 602 if there is a word embedding entry stored in a cache at the electronic device, which is associated with the word input by the user. A word embedding is a vector of values which represents the location of a word in a multidimensional space, each entry in the vector denoting to what degree the word exhibits a feature represented by one of the dimensions of the space. If there is a word embedding in the cache for the input word, this is retrieved at operation 610 and processed through an ANN such as the ANN of FIG. 3 or 4, to compute a predicted word embedding 614.

In the situation where the cache has no word embedding stored for the word input by the user, the word is optionally input to a word embedding model 604. The parameters of the word embedding model 604 may be stored at the cache or at another memory location which is available to the electronic device.

In some examples the word embedding model is implemented at the electronic device itself. In other examples the word embedding model is a cloud service available to the electronic device. The word embedding model is a predictive model which takes as input a word and computes a predicted word embedding 606. For example, the word embedding model is a character-compositional word embedding model which is a model that takes into account one or more characters of each word. The word embedding model is parameterised and is trained in advance using labelled training data.

In an example the character-compositional word embedding model is convolutional. For example, character embedding vectors are retrieved for each character of each word from a lookup table which forms part of the model's parameters. For example, the character embedding vectors are learned via backpropagation during training of the model in the same way as the model's other parameters. The retrieved character embedding vectors for a given word are fed into a set of one-dimensional convolution filters. The maximum output of each one-dimensional convolution over the length of the word is then obtained. These maximum outputs are fed through additional dense feedforward layers (such as a highway layer) of the neural network to yield a word embedding for the word in question. This is one example of an architecture based on convolutions and others are possible.

In other examples the character-compositional word embedding model is a character recurrent neural network which has either unidirectionality or is bidirectional. In some examples the recurrent neural network uses gated recurrent units (GRUs) or long short term memory (LSTM) cells. In some examples the character-compositional word embedding model is a combination (such as a concatenation, sum or other hybrid) of a neural network which represents each word in terms of its characters, and an additional per-word correction term, comprising a learned vector representation for each of the words in a defined vocabulary, and a learned out-of-vocabulary representation for other words.

In some examples the character-compositional word embedding model is a combination (such as a concatenation, sum or other hybrid) of a neural network and a deterministic pseudo-random correction term based on a hash of the word.

The word embedding model computes a predicted word embedding 606 which is added to the cache 608. The predicted word embedding 606 is also processed through the neural network 612 such as a recurrent neural network of FIGS. 4 and 5. The output of the neural network is a predicted word embedding 614.

In order to compute predicted words from the predicted word embedding the electronic device makes use of the cached word embeddings or of the stored parameter values of the word embedding model. By re-using data in the cache and/or by sharing the parameter values of the word embedding model it is possible to save significant memory and resources as described above. That is, it is not necessary to maintain separate word embeddings (or word embedding models) for the input and output stages. Also, by dynamically adding to the cache during prediction time there is continual improvement in the ability to use the cached data and save on resources, as the cache becomes more and more likely to hold needed values over time. In the process of FIG. 6 it is not necessary to store and maintain two copies of parameters for character-compositional word models (one for the input stage and one for the output stage).

The electronic device looks for word embeddings in the cache which are similar to the predicted word embedding. The cache already has stored words corresponding to the word embeddings it holds. So the electronic device is able to quickly find candidate word predictions from the cache and is able to rank those according to degree similarity between the cached word embedding and the predicted word embedding. In some examples the electronic device computes a dot product between the predicted word embedding and the cached word embedding to give a score. This is done for a plurality of the cached word embeddings and the scores used to rank the corresponding words.

In some examples the electronic device optionally receives candidate word embeddings from another source, such as a word completion/correction predictor. The word completion/correction predictor may be independent of the neural network used at operation 612. The word completion/correction predictor takes as input at least the user input word (as at operation 600) and produces as output one or more candidate completions of the word or one or more candidate corrections of the word. The word completion/correction predictor is a neural network model or a n-gram word model or any other type of model for predicting/correcting words. The word completion/correction predictor is at the electronic device in some cases. In some cases the word completion/correction predictor is a cloud service or at another entity accessible by the electronic device.

The candidate words produced by the word completion/correction predictor are input to the word embedding model to compute corresponding predicted word embeddings. This gives pairs of known words and corresponding word embeddings. The pairs are added to the set of candidates to be searched. In this way the output of the neural network is converted into candidate words in an accurate and yet efficient manner which facilitates operation on resource constrained devices, since the search space is restricted in an intelligent manner. The outputs of the neural network are accurate and obtained in real time during the prediction process of FIG. 6, so that input of text to an electronic device which is constrained in terms of physical size as well as memory and processing capacity is facilitated.

The output of the process is one or more ranked words 622 where the ranks are computed from the degree of similarity as mentioned above. In some examples the output of the process comprises words with associated probability values, where the probability values sum to one over a known vocabulary of possible words. This is achieved using a full softmax normalization at prediction time which is resource intensive as it involves storing the vocabulary. In some examples, where the neural network used at operation 612 was trained using noise contrastive estimation, the scores from the dot products mentioned above are used as approximate log-probability predictions without the need to store the vocabulary.

One or more word embeddings of previous seen words may be used to form a context vector, such as the context vectors described earlier in this document. For example, in the case of a recurrent neural network (RNN) a concatentation of word embeddings of previous seen words forms a context vector, such as the context vectors described earlier in this document. For example in the case of a fast compressed neural network (FCNN) a concatentation of word embeddings of previous seen word forms a context vector, such as the context vectors described earlier in this document. Thus in some examples the cache holds all or at least part of the embedding matrix described earlier in this document and the method of FIG. 6 retrieves a context vector at operation 610 and computes a predicted context vector at operation 614. In this case retrieving 618 candidate word embeddings from the cache involves accessing the embedding matrix from the cache.

In various of the examples described herein quantization of the parameters such as the weights of the neural network is included as an optional processing step. The quantization of the weights is either done after training is complete or during training. The weights are represented as either full accuracy floating point or doubles or with quantized fractional integer values down to 8 bits per value. In some examples quantization of the weights is achieved down to one bit per parameter. Weight quantization acts to compress the size of the trained neural network to facilitate the use of the neural network in mobile devices and other resource constrained devices.

Figure 7:
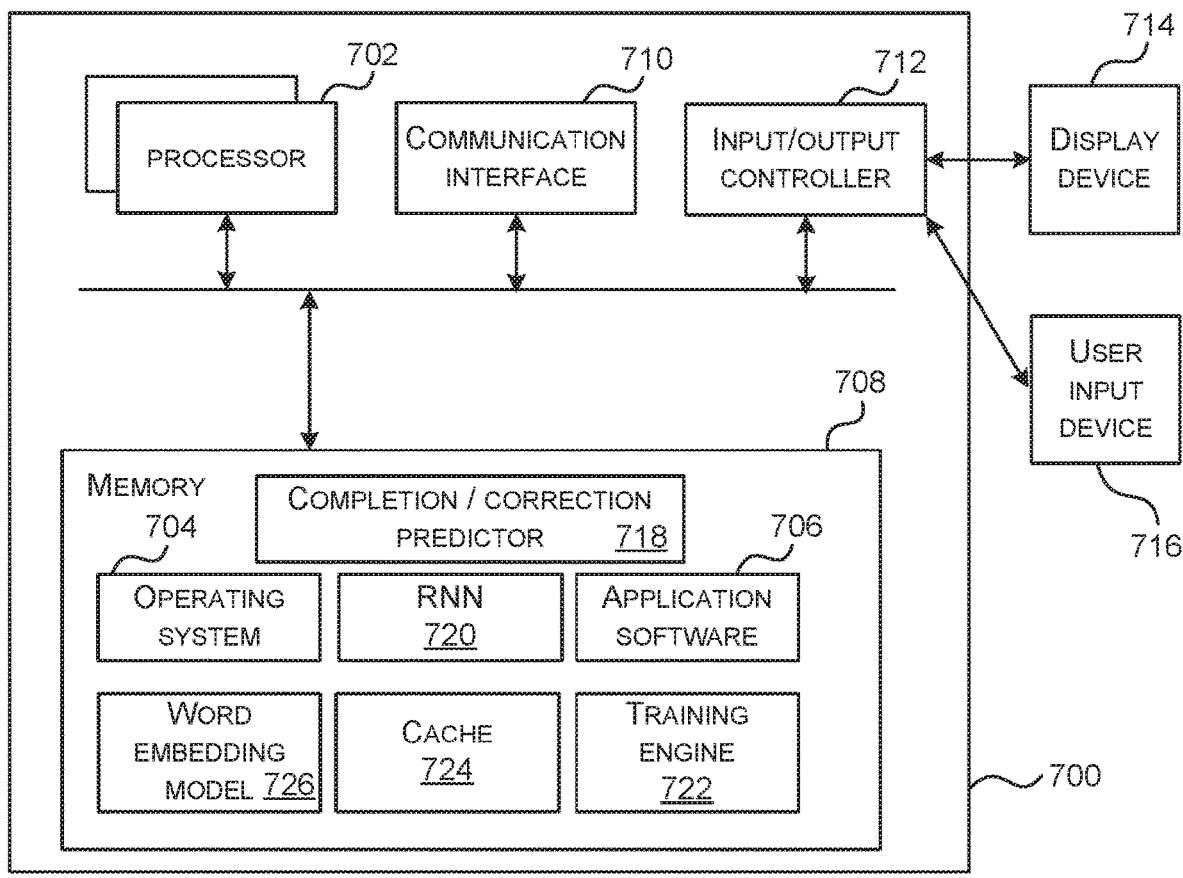
FIG. 7 illustrates an exemplary computing-based device in which embodiments of an artificial neural network are implemented.

FIG. 7 illustrates various components of an exemplary computing-based device 700 which are implemented as any form of a computing and/or electronic device, and in which embodiments of an artificial neural network is implemented in some examples. For example, in some cases the computing-based device 700 is a smart phone, tablet computer, or wearable computer which has limited memory and processing capacity and which has a keyboard (physical or soft) of limited size.

Computing-based device 700 comprises one or more processors 802 which are microprocessors, controllers or any other suitable type of processors for processing computer executable instructions to control the operation of the device in order to predict words. In some examples, for example where a system on a chip architecture is used, the processors 702 include one or more fixed function blocks (also referred to as accelerators) which implement a part of the method of predicting words in hardware (rather than software or firmware). Platform software comprising an operating system 704 or any other suitable platform software is provided at the computing-based device to enable application software 706 to be executed on the device. The memory holds a neural network 720 such as the recurrent neural network of FIGS. 4 and 5. The memory also holds a word embedding model 726 in some cases. The memory comprises a cache 724 configured to hold pairs each pair comprising a word and a corresponding word embedding. In some examples the memory holds a completion/correction predictor 718. In some cases the cache 724 holds values of parameters of the word embedding model 726. The computing-based device has a training engine 722 in some examples, configured to train one or more of the word embedding model 726, the completion/correction predictor, and the neural network 720.

The computer executable instructions are provided using any computer-readable media that is accessible by computing based device 700. Computer-readable media includes, for example, computer storage media such as memory 708 and communications media. Computer storage media, such as memory 708, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 708) is shown within the computing-based device 700 it will be appreciated that the storage is, in some examples, distributed or located remotely and accessed via a network or other communication link (e.g. using communication interface 710).

The computing-based device 700 also comprises an input/output controller 712 arranged to output display information to a display device 714 which may be separate from or integral to the computing-based device 700. The display information may provide a graphical user interface. The input/output controller 712 is also arranged to receive and process input from one or more devices, such as a user input device 716 (e.g. a mouse, keyboard, camera, microphone or other sensor). In some examples the user input device 716 detects voice input, user gestures or other user actions and provides a natural user interface (NUI). This user input may be used to select predicted words in order to input text to the device, to input text, to set parameter values or for other purposes. In an embodiment the display device 714 also acts as the user input device 716 if it is a touch sensitive display device. The input/output controller 712 outputs data to devices other than the display device in some examples, e.g. a locally connected printing device.

Any of the input/output controller 712, display device 714 and the user input device 716 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods). The functionality of any one or more of the neural network 720, the word embedding model 726, the completion/correction predictor 718 and the training engine 722 may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following:

An electronic device comprising:
a processor,
at least one input interface, and
an artificial neural network, comprising an input layer, an output layer, at least first and second hidden layers, and an encoding matrix, wherein the number of units of the second hidden layer is equal to the number of units of the input layer;

wherein the processor is configured to generate one or more predicted next items in a sequence of items based on an input sequence item received at the at least one input interface by:
retrieving a context vector corresponding to the input sequence item using the encoding matrix of the neural network;
processing the context vector with the artificial neural network;
retrieving an output vector at the output layer of the artificial neural network by transforming the output of the second hidden layer of the artificial neural network with the encoding matrix, wherein the output vector corresponds to one or more predicted next items; and
outputting the output vector.

The electronic device wherein the processor is configured to process the context vector with the artificial neural network by:
providing the context vector to the input layer of the artificial neural network;
multiplying the contents of the input layer with a first weight matrix W0 and providing the result to the first hidden layer of the artificial neural network;
processing the input to the first hidden layer with the nodes of the first hidden layer to produce an output of the first hidden layer;
multiplying the output of the first hidden layer with a second weight matrix W1 and providing the result to the second hidden layer of the artificial neural network; and
processing the input to the second hidden layer with the nodes of the second hidden layer to produce an output of the second hidden layer;

The electronic device wherein the artificial neural network further comprises a recurrent hidden vector.

The electronic device wherein the processor is configured to concatenate the contents of the input layer with the recurrent hidden vector prior to processing the contents of the input layer with the hidden layers of the artificial neural network.

The electronic device wherein the recurrent hidden vector comprises data indicative of a previous state of the artificial neural network.

The electronic device wherein the processor is configured to update the recurrent hidden vector according to the output of the first hidden layer.

The electronic device wherein the processor is configured to update the recurrent hidden vector by replacing the recurrent hidden vector with the output of the first hidden layer.

The electronic device wherein the processor is configured to retrieve the context vector by retrieving a row or column from the encoding matrix that corresponds to the input received at the at least one input interface.

The electronic device wherein the processor is configured to produce a 1-of-N vector corresponding to the input sequence item and to retrieve the context vector by transforming the 1-of-N vector using the encoding matrix.

The electronic device wherein transforming the 1-of-N vector comprises multiplying the 1-of-N vector and the encoding matrix using matrix multiplication.

The electronic device wherein the processor is further configured to retrieve an output class prediction from the output layer of the artificial neural network, wherein the output class prediction defines a group of one or more sequence items.

The electronic device wherein the processor is configured to restrict the transformation of the output of the second hidden layer with the encoding matrix to include only the one or more sequence items in the output class prediction.

The electronic device wherein the sequence of items is a sequence of one of more of: words, characters, morphemes, word segments, punctuation, emoticons, emoji, stickers, and hashtags.

The electronic device wherein the at least one input interface is a keyboard, and wherein the input sequence item is one of: a word, character, morpheme, word segment, punctuation, emoticon, emoji, sticker, a hashtag, and keypress location on a soft keyboard.

The electronic device further comprising a touch-sensitive display, and wherein the keyboard is a soft keyboard and the processor is configured to output the soft keyboard on a display.

The electronic device wherein the processor is further configured to:
  determine one or more sequence predictions from the output vector;
  generate one or more display objects corresponding to the one or more sequence predictions; and
  output the one or more display objects on a display.

The electronic device wherein the one or more display objects are selectable, and wherein upon selection of one of the one or more display objects, the processor is configured to select the sequence item corresponding to the selected display object.

The electronic device wherein the processor is configured to generate one or more further predicted items in the sequence of items based on the selected one of the one or more selectable display objects.

A computer-implemented method for generating one or more predicted next items in a sequence of items based on an input sequence item, the method comprising:
  receiving, at an electronic device, an input sequence item;
  retrieving, from an encoding matrix, a context vector corresponding to the input sequence item;
  processing the context vector with an artificial neural network, wherein the artificial neural network comprises an input layer, a first hidden layer, a second hidden layer and an output layer;
  retrieving an output vector at the output layer of the artificial neural network by transforming the output of the second hidden layer of the artificial neural network with the encoding matrix, wherein the output vector corresponds to one or more predicted next items; and
  outputting the output vector,
  wherein the number of units of the second hidden layer of the artificial neural network is equal to the number of units of the input layer of the artificial neural network.

The method described above, wherein processing the context vector with the artificial neural network comprises:
  providing the context vector to the input layer of the artificial neural network;
  multiplying the contents of the input layer with a first weight matrix $W0$ and providing the result to the first hidden layer of the artificial neural network;
  processing the input to the first hidden layer with the nodes of the first hidden layer to produce an output of the first hidden layer; multiplying the output of the first hidden layer with a second weight matrix $W1$ and providing the result to the second hidden layer of the artificial neural network; and
  processing the input to the second hidden layer with the nodes of the second hidden layer to produce an output of the second hidden layer The method described above, wherein the artificial neural network comprises a recurrent hidden vector, and wherein the method further comprises concatenating the contents of the input layer with the recurrent hidden vector prior to processing the contents of the input layer with the hidden layers of the artificial neural network.

The method described above, wherein the recurrent hidden vector comprises data indicative of a previous state of the artificial neural network, and wherein the recurrent hidden vector is updated according to the output of the first hidden layer.

The method described above, where the recurrent hidden vector is updated by replacing the recurrent hidden vector with the output of the first hidden layer.

The method described above, wherein the step of retrieving a context vector comprises retrieving a row or column from the encoding matrix that corresponds to the input sequence item.

The method described above, further comprising, prior to the step of retrieving a context vector, producing a 1-of-N vector corresponding to the input sequence item, and wherein the step of retrieving a context vector comprises transforming the 1-of-N vector with the encoding matrix.

The method described above, wherein transforming the 1-of-N vector comprises multiplying the 1-of-N vector and the encoding matrix using matrix multiplication.

The method described above, further comprising, prior to retrieving an output vector, retrieving an output class prediction from the output layer of the artificial neural network, wherein the output class prediction defines a group of one or more sequence items.

The method described above, wherein, at the step of retrieving an output vector, the transformation of the output of the second hidden layer with the encoding matrix is restricted to include only the one or more sequence items corresponding to the output class prediction.

The method described above, wherein the sequence of items is a sequence of one of more of: words, characters, morphemes, word segments, punctuation, emoticons, emoji, stickers, and hashtags.

The method described above, wherein the at least one input interface is a keyboard, and wherein the input sequence item is one of: a word, character, morpheme, word segment, punctuation, emoticon, emoji, sticker, a hashtag, and keypress location on a soft keyboard.

The method described above, further comprising the steps:
  determining one or more sequence predictions from the output vector;
  generating one or more display objects corresponding to the one or more sequence predictions; and
  outputting the one or more display objects on a display.

The method described above, wherein the one or more display objects are selectable, and wherein the method further comprises, upon selection of one the one or more display objects, selecting the sequence item corresponding to the selected display object.

The method described above, further comprising the step:
  generating one or more further predicted items in the sequence of items based on the selected one of the one or more display objects.

A computer-readable medium containing instructions that, when executed by a processor, cause the processor to perform the method of any one of combinations described above.

An electronic device comprising:
  a processor,
  at least one input interface, and
  an artificial neural network, comprising an input layer, an output layer and at least first and second hidden layers, wherein the number of units of the second hidden layer is equal to the number of units of the input layer;
  wherein the processor is configured to generate one or more predicted next items in a sequence of items based on an input sequence item received at the at least one input interface by:
    retrieving a context vector corresponding to the input sequence item using stored data;
    processing the context vector with the artificial neural network;
    retrieving an output vector at the output layer of the artificial neural network by transforming the output of the second hidden layer of the artificial neural network using the stored data, wherein the output vector corresponds to one or more predicted next items; and
    outputting the output vector.

The electronic device described above wherein the stored data is either values of parameters of a character-compositional model which is a predictor configured to compute a location of an item in a multi-dimensional space from individual characters of the item, or the stored data is item embeddings being locations of items in the multi-dimensional space. The electronic device described above where the stored data is held in a cache and wherein the processor is configured to compute an item embedding corresponding to the input sequence item from the character-compositional model and to add the item embedding to the cache.

The electronic device described above where the processor is configured to retrieve the context vector corresponding to the input sequence by accessing an item embedding from a cache.

The term 'subset' is used herein to refer to a proper subset such that a subset of a set does not comprise all the elements of the set (i.e. at least one of the elements of the set is missing from the subset It will be appreciated that this description is by way of example only; alterations and modifications may be made to the described embodiments without departing from the scope of the invention as defined in the claims.

The invention claimed is:

1. An electronic device comprising:
  a processor,
  at least one input interface, and
  an artificial neural network, comprising an input layer, an output layer and at least first and second hidden layers, wherein a number of units of the second hidden layer is equal to a number of units of the input layer;
  wherein the processor is configured to generate one or more predicted next items in a sequence of items based on an input sequence item received at the at least one input interface by:
    retrieving a context vector corresponding to the input sequence item from an encoding matrix configured to map each of a plurality of input sequence items into a discrete form processable by the artificial neural network;
    processing the context vector with the artificial neural network;
    generating an output vector at least by transforming the output of the second hidden layer of the artificial neural network using the encoding matrix, wherein the output vector corresponds to a probability distribution for one or more predicted next items in the sequence of items, each of the predicted next items included in the plurality of input sequence items for the encoding matrix; and
    outputting the output vector.

2. The electronic device of claim 1 wherein the encoding matrix includes either values of parameters of a character-compositional model which is a predictor configured to compute a location of an item in a multi-dimensional space from individual characters of the item, or the encoding matrix includes item embeddings being locations of items in the multi-dimensional space.

3. The electronic device of claim 2 where the encoding matrix is held in a cache and wherein the processor is configured to compute an item embedding corresponding to the input sequence item from the character-compositional model and to add the item embedding to the cache.

4. The electronic device of claim 1 where the processor is configured to retrieve the context vector corresponding to the input sequence by accessing an item embedding from a cache.

5. The electronic device of claim 1, wherein the processor is configured to process the context vector with the artificial neural network by:
  providing the context vector to the input layer of the artificial neural network;
  multiplying the contents of the input layer with a first weight matrix $W_0$ to generate a first result, and providing the first result to the first hidden layer of the artificial neural network;
  processing the input to the first hidden layer with nodes of the first hidden layer to produce an output of the first hidden layer;
  multiplying the output of the first hidden layer with a second weight matrix $W_1$ to generate a second result, and providing the second result to the second hidden layer of the artificial neural network; and
  processing the input to the second hidden layer with nodes of the second hidden layer to produce an output of the second hidden layer.

6. The electronic device of claim 5, wherein the artificial neural network further comprises a recurrent hidden vector.

7. The electronic device of claim 6, wherein the processor is configured to concatenate the contents of the input layer with the recurrent hidden vector prior to processing the contents of the input layer with the hidden layers of the artificial neural network.

8. The electronic device of claim 6, wherein the recurrent hidden vector comprises data indicative of a previous state of the artificial neural network.

9. The electronic device of claim 8, wherein the processor is configured to update the recurrent hidden vector according to the output of the first hidden layer.

10. The electronic device of claim 9, wherein the processor is configured to update the recurrent hidden vector by replacing the recurrent hidden vector with the output of the first hidden layer.

11. The electronic device of claim 1, wherein the processor is configured to retrieve the context vector by retrieving a row or column of the encoding matrix that corresponds to the input received at the at least one input interface.

12. The electronic device of claim 11, wherein the processor is configured to produce a 1-of-N vector corresponding to the input sequence item and to retrieve the context vector by transforming the 1-of-N vector using the encoding matrix.

13. The electronic device of claim 12, wherein transforming the 1-of-N vector comprises multiplying the 1-of-N vector and the encoding matrix using matrix multiplication.

14. The electronic device of claim 1, wherein the processor is further configured to retrieve an output class prediction from the output layer of the artificial neural network, wherein the output class prediction defines a group of one or more sequence items.

15. A computer-implemented method for generating one or more predicted next items in a sequence of items based on an input sequence item, the method comprising:

receiving, at an electronic device, the input sequence item;

retrieving, from an encoding matrix configured to map each of a plurality of input sequence items into a discrete form processable by an artificial neural network, a context vector corresponding to the input sequence item;

processing the context vector with the artificial neural network, wherein the artificial neural network comprises an input layer, a first hidden layer, a second hidden layer and an output layer;

generating an output vector at least by transforming the output of the second hidden layer of the artificial neural network using the encoding matrix, wherein the output vector corresponds to a probability distribution for one or more predicted next items in the sequence of items, each of the predicted next items included in the plurality of input sequence items for the encoding matrix; and outputting the output vector, wherein a number of units of the second hidden layer of the artificial neural network is equal to a number of units of the input layer of the artificial neural network.

* * * * *